United States Patent
McClintock

(10) Patent No.: US 7,322,629 B2
(45) Date of Patent: Jan. 29, 2008

(54) LOCKING HINGE FOR A DOOR STRUCTURE

(75) Inventor: Steven D. McClintock, South Lyon, MI (US)

(73) Assignee: Intier Automotive Inc., Newmarket (CA)

(*) Notice: Subject to any disclaimer, the term of this patent is extended or adjusted under 35 U.S.C. 154(b) by 3 days.

(21) Appl. No.: 11/189,297

(22) Filed: Jul. 26, 2005

(65) Prior Publication Data

US 2007/0024077 A1  Feb. 1, 2007

(51) Int. Cl.
*B60N 2/30* (2006.01)
*E05D 11/10* (2006.01)

(52) U.S. Cl. .................. 296/37.14; 296/37.8; 16/324

(58) Field of Classification Search ............ 296/37.8, 296/37.14, 65.05; 16/324, 326, 327, 374
See application file for complete search history.

(56) References Cited

U.S. PATENT DOCUMENTS

| | | | | |
|---|---|---|---|---|
| 1,336,430 A | * | 4/1920 | Gustafson | 292/63 |
| 3,336,075 A | * | 8/1967 | Wilson | 296/146.4 |
| 3,448,486 A | * | 6/1969 | Wright | 16/324 |
| 3,629,900 A | | 12/1971 | Beeril, Jr. | |
| 3,744,085 A | | 7/1973 | Griego | |
| 3,874,029 A | | 4/1975 | McCullough | |
| 3,969,788 A | * | 7/1976 | McCullough | 16/326 |
| 4,385,418 A | | 5/1983 | Loftis et al. | |
| 4,620,741 A | * | 11/1986 | Hanemaayer | 296/37.14 |
| 5,193,695 A | | 3/1993 | Mann | |
| 5,707,103 A | | 1/1998 | Balk | |
| 5,709,157 A | | 1/1998 | Hanusiak | |
| 5,711,053 A | | 1/1998 | Hafner | |
| 6,317,928 B1 | | 11/2001 | Guillemette | |
| 6,442,800 B1 | * | 9/2002 | Morawetz | 16/337 |
| 6,523,223 B2 | * | 2/2003 | Wang | 16/324 |
| 6,591,453 B2 | | 7/2003 | Jenks | |
| 6,644,709 B2 | * | 11/2003 | Inagaki et al. | 296/37.16 |
| 6,644,710 B2 | * | 11/2003 | Seel et al. | 296/37.5 |
| 6,719,348 B1 | * | 4/2004 | Song | 296/39.1 |
| 6,820,914 B2 | * | 11/2004 | Behrends et al. | 296/66 |
| 6,890,015 B2 | * | 5/2005 | Carlsson et al. | 296/37.14 |
| 6,983,985 B2 | * | 1/2006 | McGowan et al. | 297/15 |
| 7,011,352 B2 | * | 3/2006 | Matsuoka et al. | 296/37.14 |
| 7,090,274 B1 | * | 8/2006 | Khan et al. | 296/37.16 |
| 2002/0121794 A1 | * | 9/2002 | Vejnar | 296/50 |
| 2003/0047957 A1 | * | 3/2003 | Bargiel | 296/65.05 |

* cited by examiner

*Primary Examiner*—D. Glenn Dayoan
*Assistant Examiner*—Greg Blankenship
(74) *Attorney, Agent, or Firm*—Honigman Miller Schwartz and Cohn LLP

(57) ABSTRACT

A locking hinge (10) includes a first hinge panel (12a) and a second hinge panel (12b) pivotably connected by a pivot pin (14) about a pivoting axis (P). A locking rod (16) is slidably received by one of the first or second hinge panels (12a, 12b) along a sliding axis (S). The sliding axis (S) is substantially parallel the pivoting axis (P). A vehicle door structure (50) includes a first panel (102a) pivotably connected relative a second panel (102b) by a first hinge (104a). A third panel (102c) is pivotably connected relative the second panel (102b) by the locking hinge (10). Pivotable movement of the second panel (102b) relative the third panel (102c) is prevented when the locking hinge (10) is in a locked state. The third panel (102c) is pivotably connected to a vehicle floor (106) by a second hinge (104c) to permit unobstructed access to a stowage cavity (125) under the vehicle floor (106) for stowing a collapsible stow-to-floor seat (150).

11 Claims, 12 Drawing Sheets

LOCKING HINGE FOR A DOOR STRUCTURE

RELATED APPLICATION

The disclosure relates generally to application Ser. No. 11/045,643 filed on Jan. 28, 2005, the entire contents of which are incorporated herein by reference.

TECHNICAL FIELD

The invention relates in general to a locking hinge for a paneled load floor door structure. According to an embodiment, the locking hinge for a paneled door is adapted for use in a vehicle, and in particular, to a load floor structure for a stow-to-floor seat comprising at least two panels that are hingably connected.

BACKGROUND

It is known in the art that mini-vans, sport utility vehicles (SUVs), and the like, include removable second and third row seating. The seating is typically latched to the load floor/floor pan (hereinafter "the vehicle floor") by a latch mechanism. When the operator needed to transport large items, the operator, usually with one or more assistants, would have to unlatch the seating and physically remove the heavy, cumbersome seating from the vehicle. This arduous task was overcome with the development of present day "stow-to-floor" seating that is now included in many vehicles. As is known in the art, stow-to-floor seating permits a operator to collapse a second or third row seat assembly into a compact configuration, which is then tumbled about or into the vehicle floor. If the seat assembly is tumbled into the vehicle floor, the operator usually exposes a stowage cavity in the vehicle floor by pivoting a door structure of the vehicle floor into an open position. An exemplary load floor door structure for providing access to a stow-to-floor stowage cavity is described in application Ser. No. 11/045,643, which is under assignment to the assignee of the present disclosure.

As illustrated in FIGS. 9A-9E, a conventional vehicle load floor structure is shown generally at 100 proximate a vehicle floor 106, which is used, in application, for a stow-to-floor seat assembly. The door structure 100 provides access to a stowage cavity, which is shown generally at 125 (FIGS. 9B-9E). The door structure 100 includes three panels, which are shown generally at 102a-102c. The panels 102a and 102b are connected by a first hinge, which is shown generally at 104a, while the panels 102b and 102c are connected by a second hinge, which is shown generally at 104b, while the panel 102c is connected to the vehicle floor 106 by a third hinge, which is shown generally at 104c.

In describing the movement of the door structure 100, reference is made from the initial positioning of the door structure 100 at FIG. 9A when the door structure 100 is in a stowed position such that the door structure 100 forms an uninterrupted, continuous surface with the vehicle floor 106. Referring to FIG. 9B, the first hinge 104a permits the first panel 102a to be folded over the second panel 102b in the direction of a pivoting arc, A1 (FIG. 9A). Accordingly, the first hinge 104a provides a clearance for the door structure 100 so that a pivoting arc, A3, of the door structure 100 about the hinge 104c does not interfere with a seat bottom cushion 152 of a rear, stow-to-floor seat 150 when the operator, O, chooses to fully expose the stowage cavity 125 (FIG. 9E). In addition to providing a clearance for the pivoting arc, A3, of the door structure 100, the first hinge 104a provides limited access to the stowage cavity 125 for storing and retrieving small items, such as, for example, compact discs (CDs) and the like.

Referring to FIGS. 9C and 9D, the second hinge 104b permits both of the first and second panels 102a, 102b to be folded over the third panel 102c in the direction of pivoting arc, A2 (FIG. 9A). As seen in FIG. 9D, the second hinge 104b provides partial, but greater access to the stowage cavity 125 (compared to FIG. 9C) without pivotably deploying the third panel 102c. Greater access to the stowage cavity 125 provides greater flexibility in stowing and removing larger items to and from the stowage cavity 125, such as, for example, brief cases, travel bags, sports equipment, laptop computers, and the like. Even further, the second hinge 104b was also included in the design of the door structure 100 to permit the operator to gain the partial, but greater access to the stowage cavity 125 when a seat back 177 and/or seat bottom 179 of a front seat 175 is in a reclined and/or fully rearward position. Accordingly, when the front seat 175 is in such a position, the door structure 100 would have been otherwise restricted from fully pivoting about the pivot arc, A3. As a result, the second hinge 104b permits the operator to have at least partial, but greater access to the stowage cavity 125 when the front seat 175 is reclined or in a rearward position.

Referring to FIG. 9E, the third hinge 104c permits the first, second, and third panels 102a-102c to be folded substantially adjacent the seat back 177 of the front seat 175 in the direction of the pivoting arc, A3 (FIG. 9A), to provide full, unobstructed access to the stowage cavity 125. Full, unobstructed access to the stowage cavity 125 provides the greatest clearance for stowing or removing items to and from the stowage cavity 125, such as, for example, the stow-to-floor seat 150.

Although the inclusion of the second hinge 104b is adequate in providing the benefit of partial, but greater access to the stowage cavity 125 without having to fully expose the stowage cavity 125, the second hinge 104b may cause the door structure 100 to undesirably fold like an accordion-style door when the door structure 100 is pivoted in the direction of the pivoting arc, A3. Accordingly, when the door structure 100 is pivoted in the direction of the pivoting arc, A3, the operator, O, as shown in FIG. 9E, typically has to support the door structure 100 in a "two-handed" operation, in which both of the operator's hands, H, are stabilizing the door structure 100 so that the door structure 100 does not interfere with the stow-to-floor seat 150 when the stow-to-floor seat 150 is tumbled into the stowage cavity 125 in the direction of arrow, T. Accordingly, although benefits of having a dual-hinge (i.e., the hinges 104a, 104b) door structure 100 are realized as described above, a stabilized, fluid, one-handed pivoting operation of the door structure 100 about the pivoting arc, A3, can not be realized in view of the fact that the first and second hinges 104a, 104b may cause the door structure 100 to collapse upon itself.

Thus, there is a need for an improved door structure 100 that is cost-effective and sufficiently stabilized with a fluid, one-handed deployment motion while also providing flexible access to the stowage cavity 125 when the front seat 175 is in the reclined or rearward position.

BRIEF DESCRIPTION OF THE DRAWINGS

The disclosure will now be described, by way of example, with reference to the accompanying drawings, in which.

DETAILED DESCRIPTION

Figure 1:
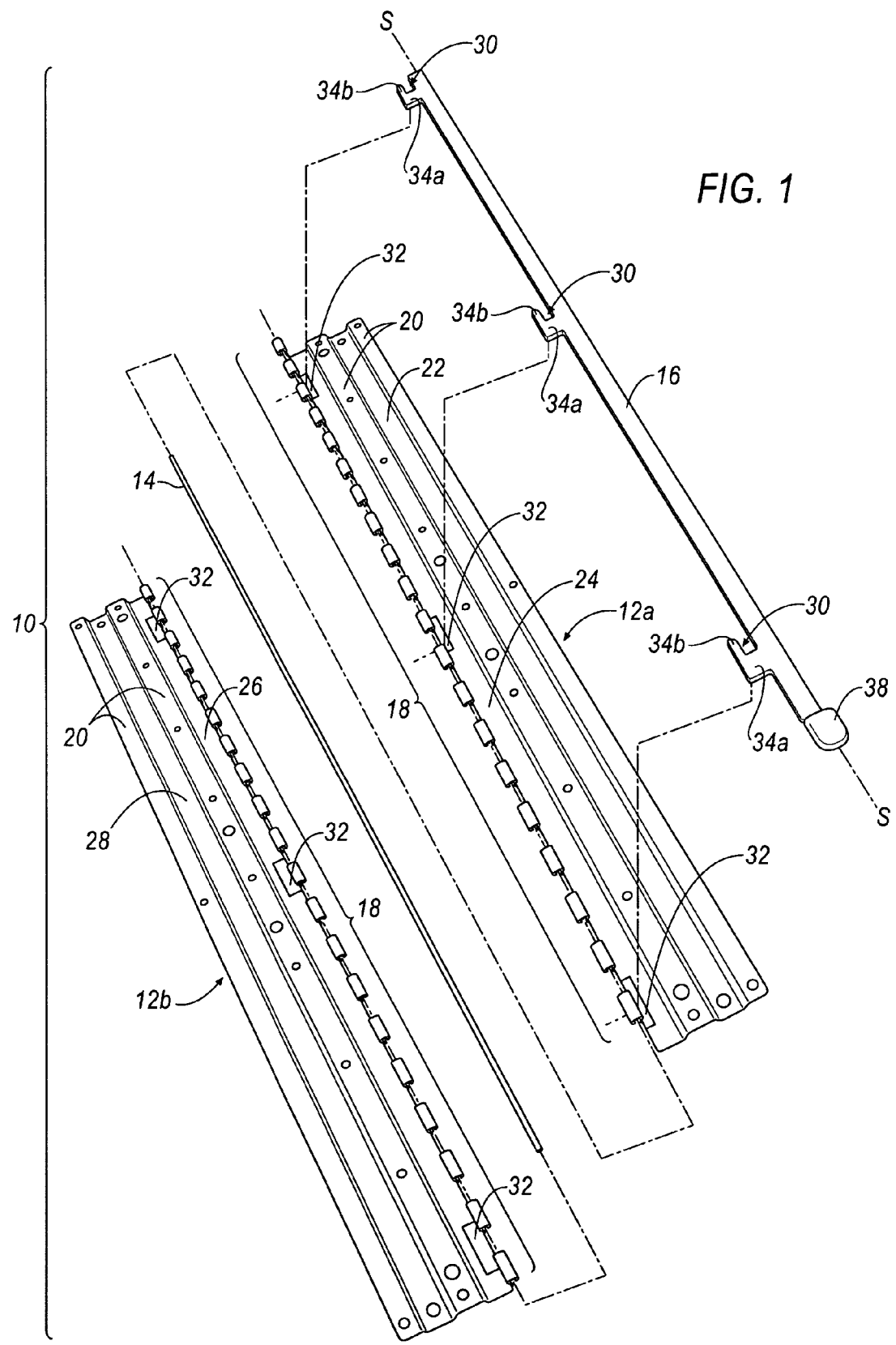
FIG. 1 is an exploded view of a locking hinge structure according to an embodiment.
Figure 2:
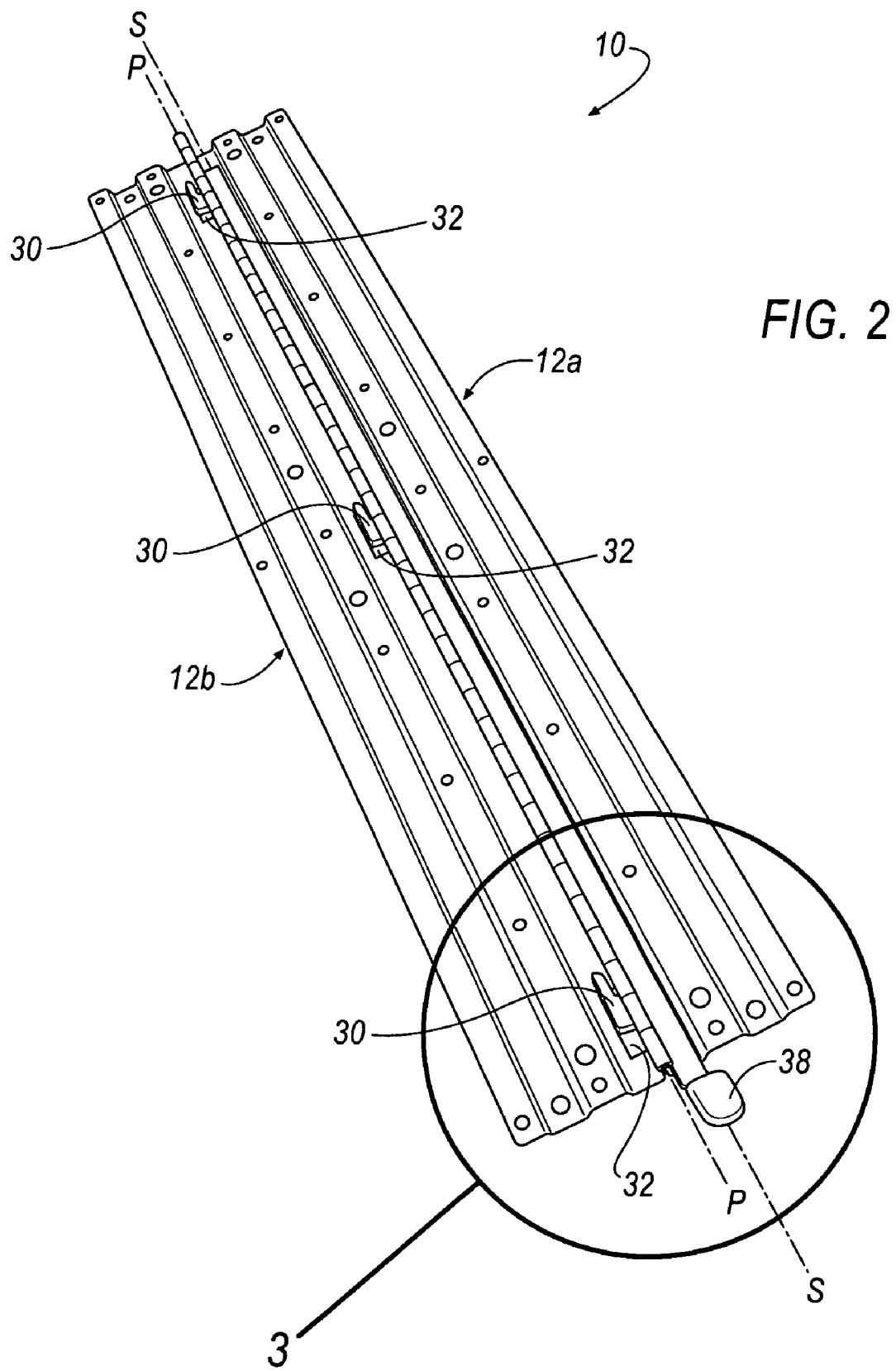
FIG. 2 is an assembled view of the locking hinge according to FIG. 1.

Referring to FIGS. 1 and 2, a locking hinge is shown generally at 10 according to an embodiment. The locking hinge 10 includes a first hinge panel 12a, a second hinge panel 12b, a pivot pin 14, and a locking rod 16. As illustrated, the first and second hinge panels 12a, 12b include meshing teeth 18 that are adapted to receive the pivot pin 14. Each hinge panel 12a, 12b includes stiffening ribs 20 parallel the meshing teeth 18. Adjacent the stiffening ribs 20 are recessed channels 22-28. The recessed channel 24 that is proximate the meshing teeth 18 of the first hinge panel 12b is adapted to slidably receive the locking rod 16. Although the recessed channel 24 is shown to slidably receive the locking rod 16, it will be appreciated that the recessed channel 26 is also capable to slidably receive the locking rod 16.

The locking rod 16 includes any desirable number of integrally-formed L-shaped locking tabs 30. The L-shaped locking tabs 30 include a radial portion 34a that integrally extends in a radial direction from the locking rod 16 relative a sliding axis, S, and an axial portion 34b that integrally extends in an axial direction from the radial portion 34a in a substantially parallel fashion with the sliding axis, S. As illustrated in FIG. 2, the pivot pin 14 is shown to be located on a pivoting axis, P, that is substantially parallel the sliding axis, S. Although the locking rod 16 is shown to include three locking tabs 30, it will be appreciated that any desirable number of locking tabs 30 may integrally extend from the locking rod 16. As illustrated in FIGS. 1-2, the locking tabs 30 extend through passages 32 formed in the first and second hinge panels 12a, 12b. Because the locking rod 16 is shaped to include a low profile that fits within the recessed channel 24, the locking rod 16 is essentially sandwiched between the outer vehicle floor door panels 102b, 102c and the hinge panels 12a, 12b (FIGS. 4A-4C).

Figures 3A, 3B, 3C:
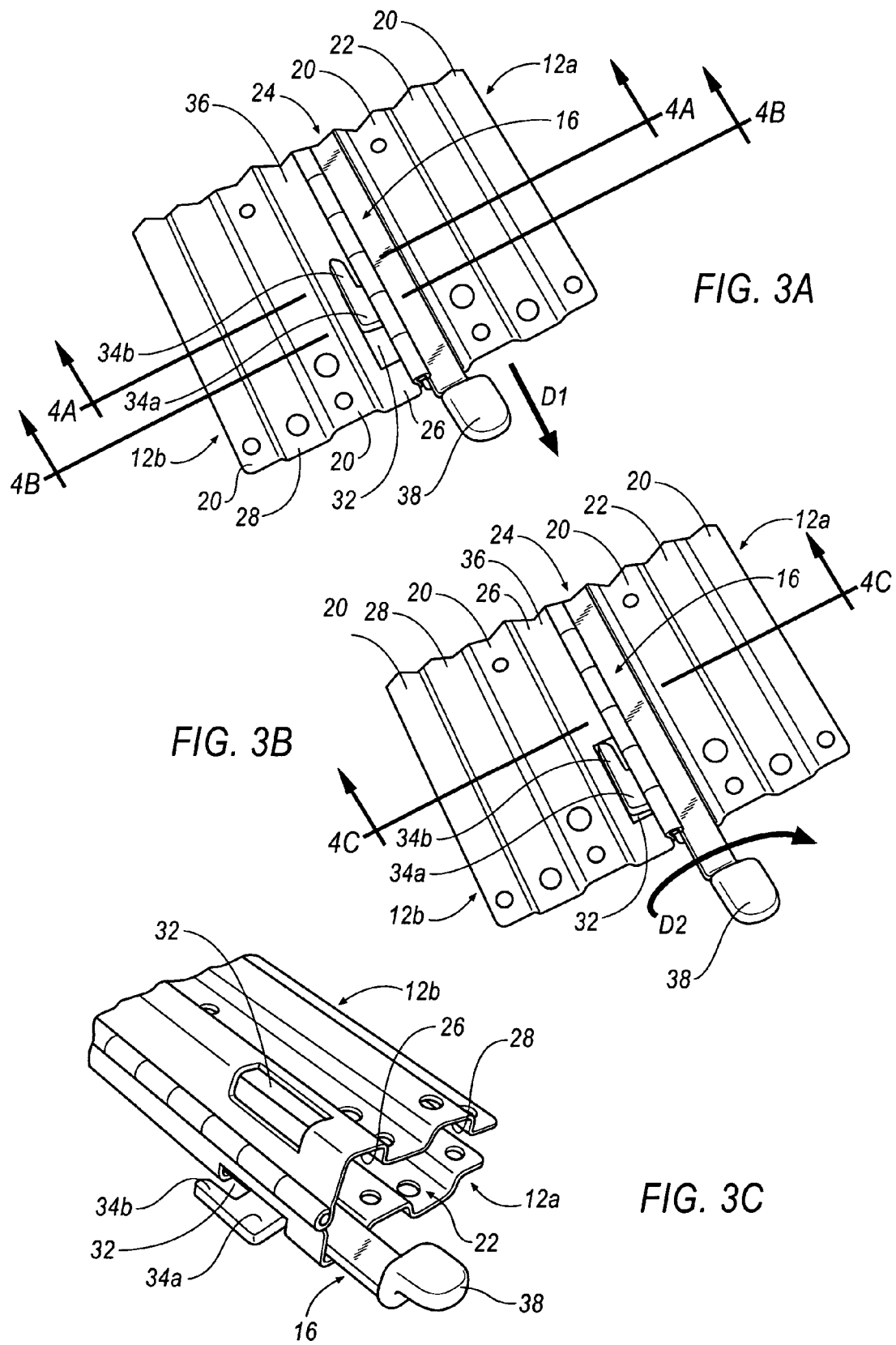
FIG. 3A is an enlarged view of the locking hinge, when in a locked position, indicated by the circled area in FIG. 2.
FIG. 3B is an enlarged view of the locking hinge of FIG. 3A when in an unlocked position.
FIG. 3C is an enlarged view of the locking hinge when in an unlocked, pivoted position according to FIG. 3B.
Figure 4A:
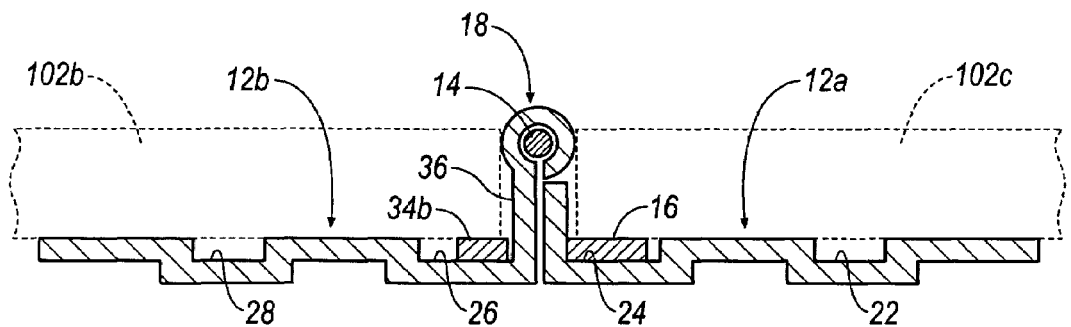
FIG. 4A is a cross-sectional view of the locking hinge according to line 4A-4A of FIG. 3A.
Figure 4B:
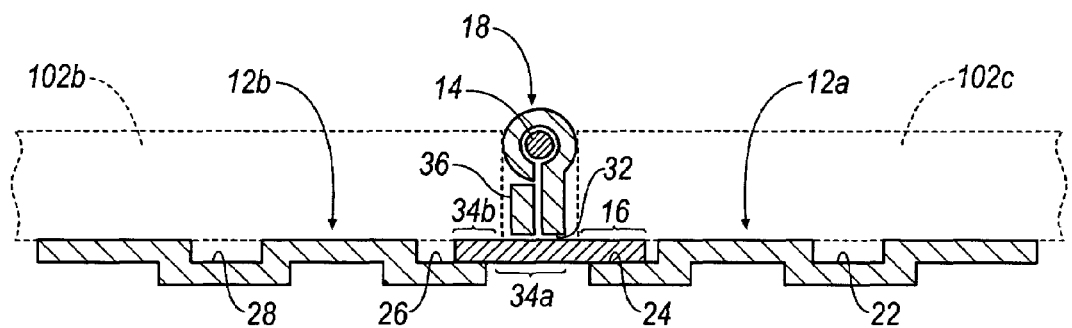
FIG. 4B is a cross-sectional view of the locking hinge according to line 4B-4B of FIG. 3A.
Figure 4C:
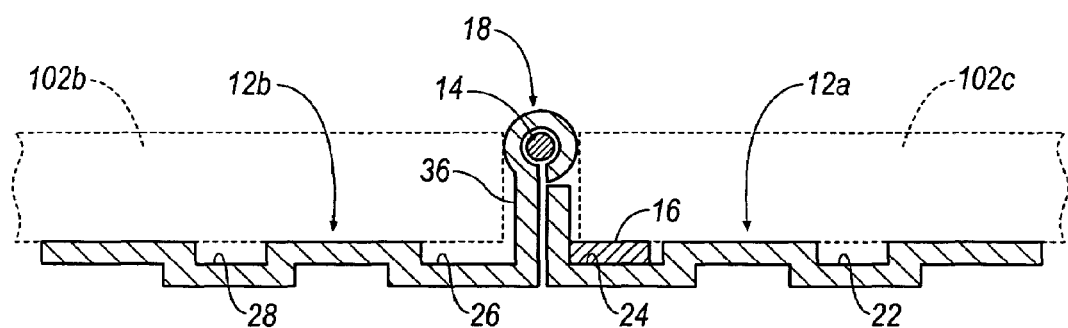
FIG. 4C is a cross-sectional view of the locking hinge according to line 4C-4C of FIG. 3B.

Referring to FIGS. 3A and 4A-4B, the locking rod 16 is shown to be positioned in a locked state relative the first and second hinge panels 12a, 12b. A "locked state" is generally defined as when the axial portion 34b of the L-shaped locking tab 30 is adjacent a substantially perpendicular wall portion 36 of the second hinge panel 12b as the radial portion 34a is hooked about the perpendicular wall portion 36. To move the locking rod 16 from the locked state to an unlocked state (FIGS. 3B and 4C), the operator, O, moves a finger 38 at one end of the locking rod 16 in a direction of the arrow, D1, to cause the locking rod 16 and integrally-formed locking tabs 30 to slide in the same direction of the arrow, D1, relative the first and second hinge panels 12a, 12b. Accordingly, as seen in FIGS. 3B and 4C, once the axial portion 34b of the locking tabs 30 is located in the passage 32 and no longer overlaps the perpendicular wall portion 36 of the second hinge panel 12b, the first and second hinge panels 12a, 12b are free to pivot about the pivot axis, P, in the direction of the arrow, D2, relative one another to permit the first and second hinge panels 12a, 12b to be positioned substantially adjacent or proximate one another (FIG. 3C).

Figure 5:
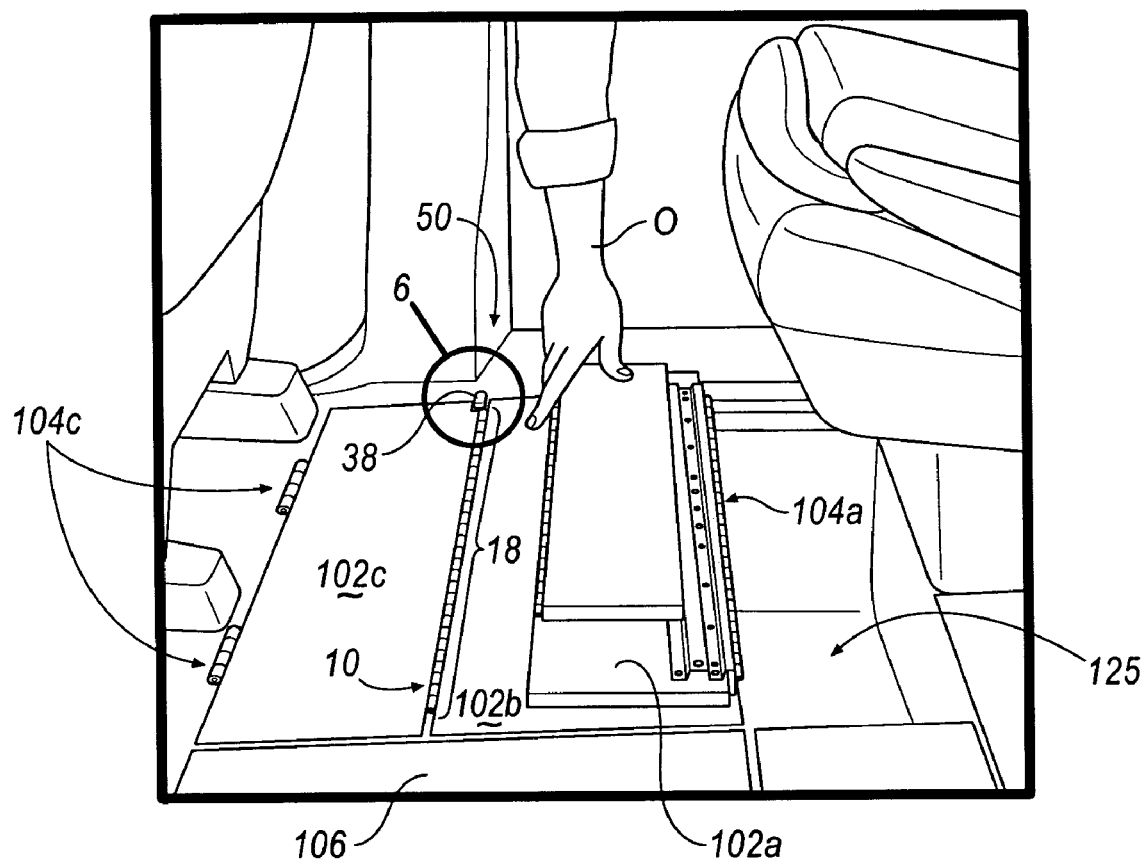
FIG. 5 is an environmental view of a door structure of a vehicle floor including the locking hinge.

Referring to FIG. 5, the locking hinge 10, for example, is adapted for use with a vehicle stow-to-floor door structure 50. In describing the operation of the door structure 50, the locking hinge 10 is shown at the location of the conventional second hinge 104b as described in FIGS. 9A-9E. Accordingly, the following description associated with FIGS. 5-7C utilizes the same references numerals used in FIGS. 9A-9E except that the locking hinge 10 is now referenced at the location of the conventional second hinge 104b; therefore, reference numeral 104b is not shown in FIGS. 5-7C. Although three panels 102a-102c and three hinges 104a, 10, and 104c are shown, it will be appreciated that the door structure 50 may include any desirable number of hinges and panels.

Figure 6A:
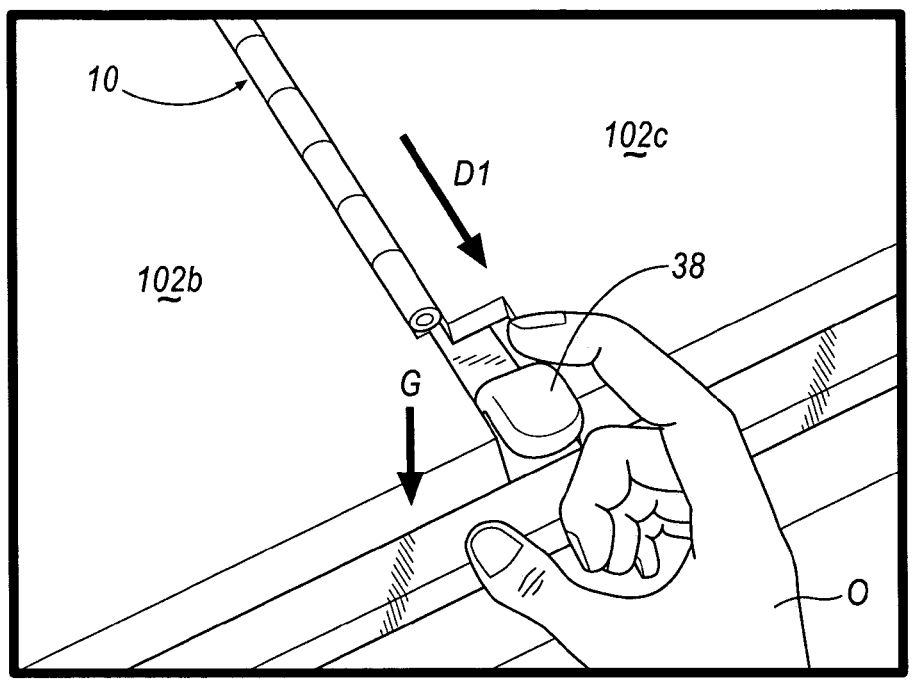
FIG. 6A is an enlarged view of the locking hinge indicated by the circled area in FIG. 5 being moved to an unlocked position.
Figure 9A:
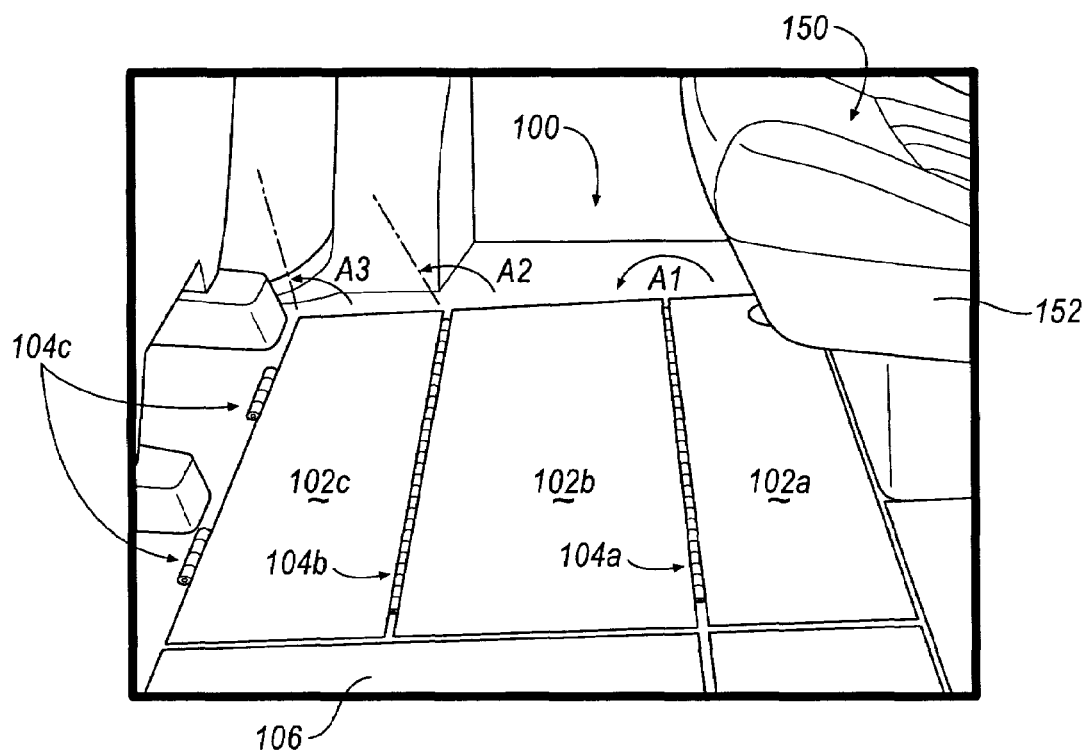
FIG. 9A is an environmental view of a conventional vehicle door structure of a stow-to-floor seat assembly.
Figure 9B:
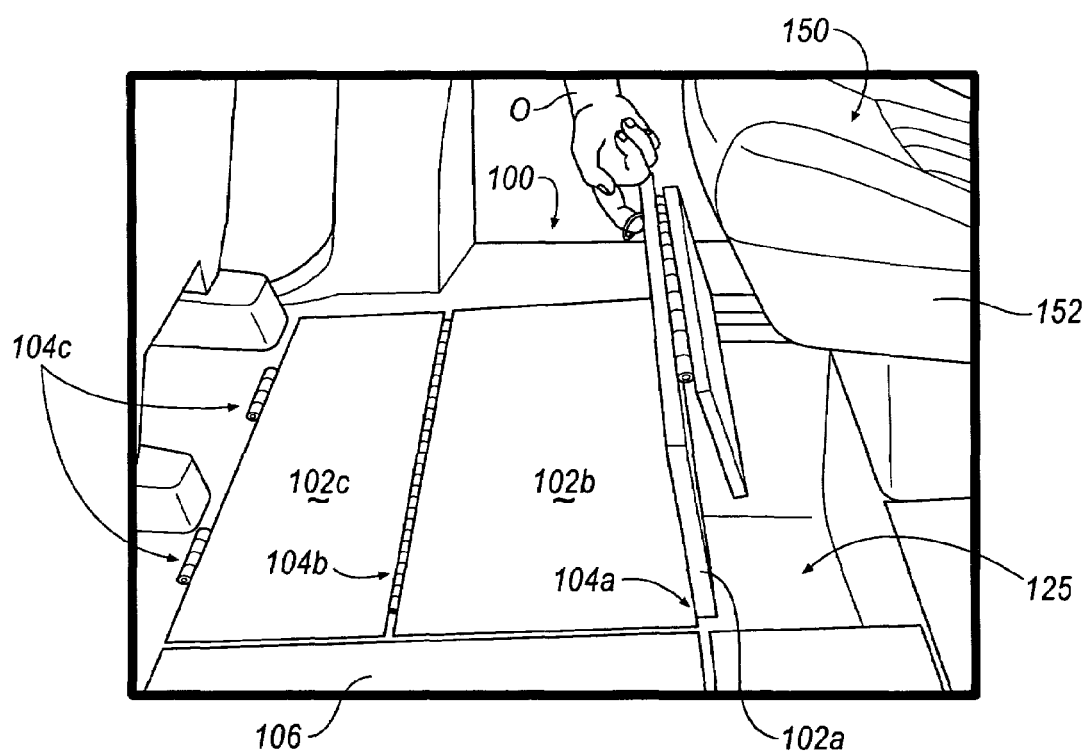
FIG. 9B is another environmental view of the conventional vehicle door structure of the stow-to-floor seat assembly.
Figure 9C:
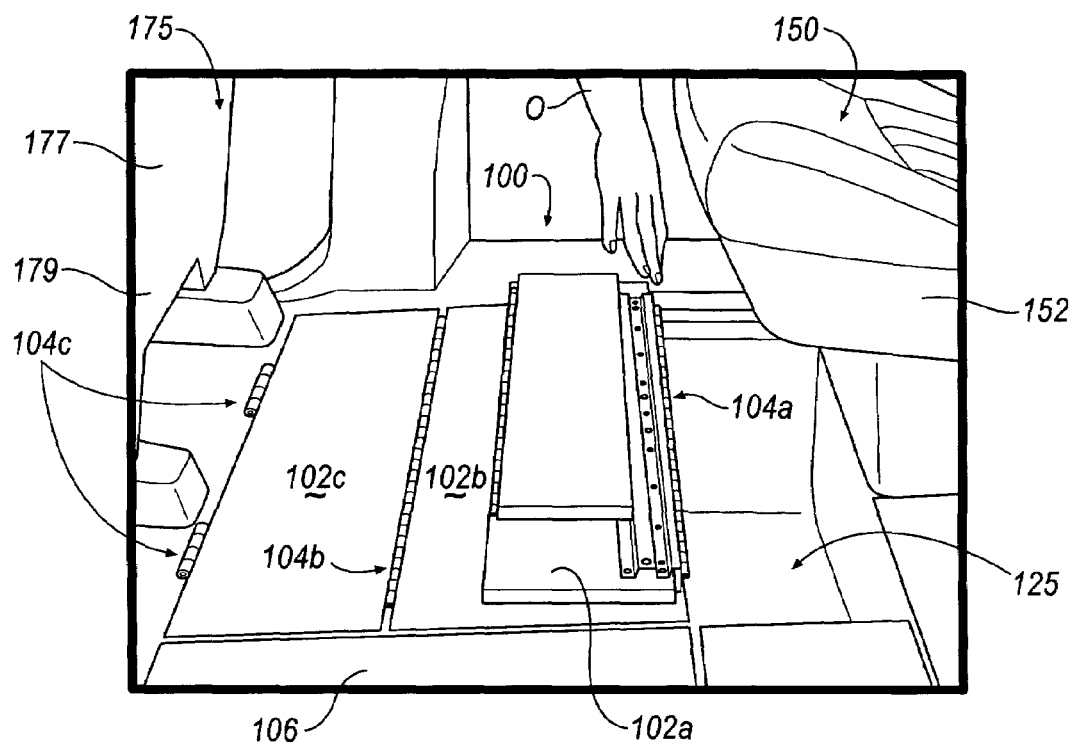
FIG. 9C is another environmental view of the conventional vehicle door structure of the stow-to-floor seat assembly.
Figure 9D:
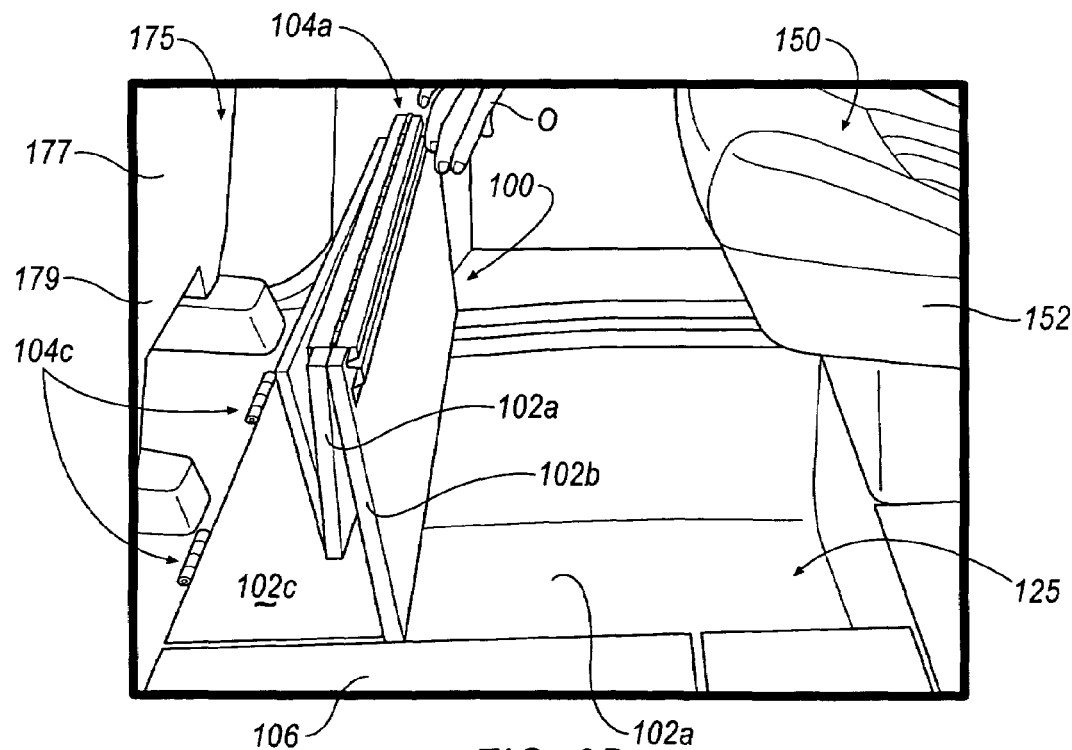
FIG. 9D is another environmental view of the conventional vehicle door structure of the stow-to-floor seat assembly.
Figure 9E:
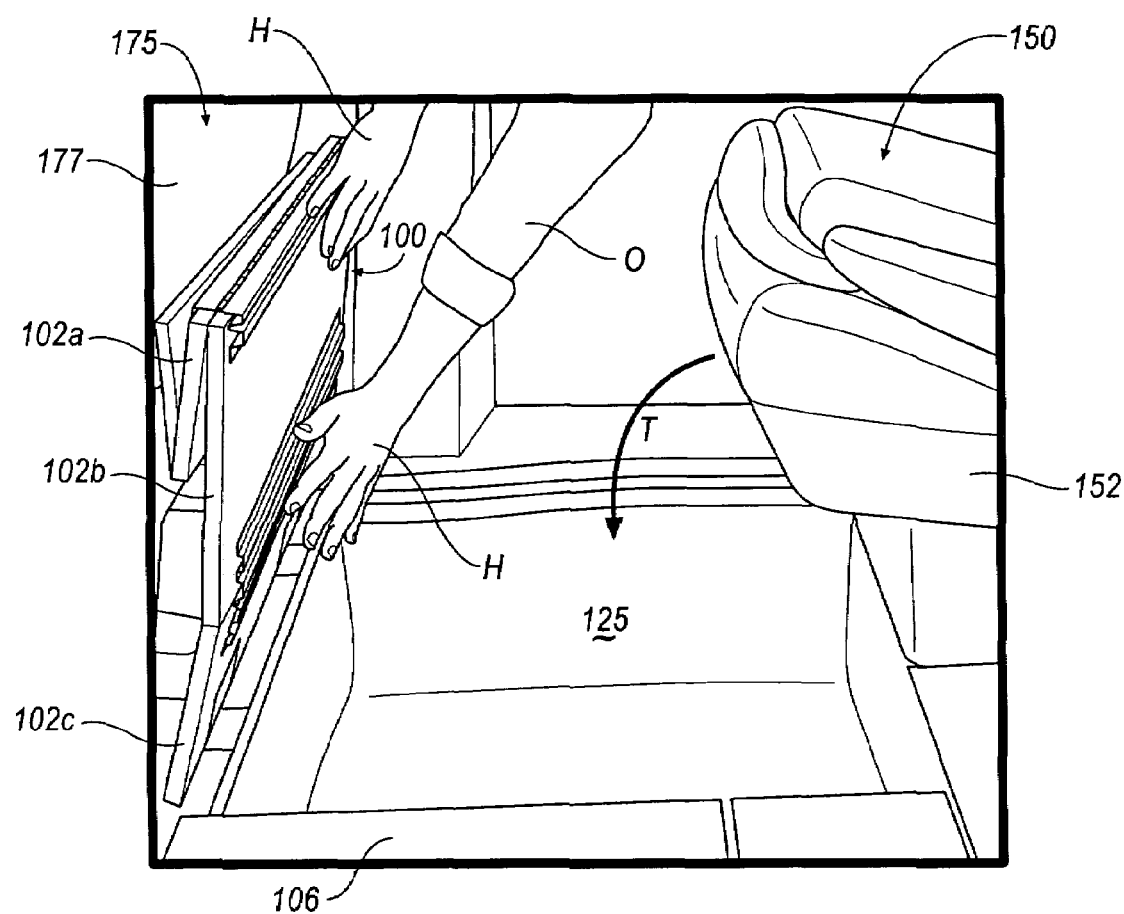
FIG. 9E is another environmental view of the conventional vehicle door structure of the stow-to-floor seat assembly.

As seen in FIG. 5, the door structure 50 is pivoted in the direction of the pivoting arc, A1, in a similar manner as shown in FIG. 9A. Then, as shown in FIG. 6A, the operator, O, may selectively move the finger 38 in the direction of the arrow, D1, to unlock the locking hinge 10. Accordingly, the door structure 50 is prepared for pivotable movement about the pivoting arcs A2 and A3 in a similar manner as shown in FIGS. 9B-9E as if the locking hinge 10 does not include a lockable feature similar to that of the conventional locking hinge 104b.

Figure 6B:
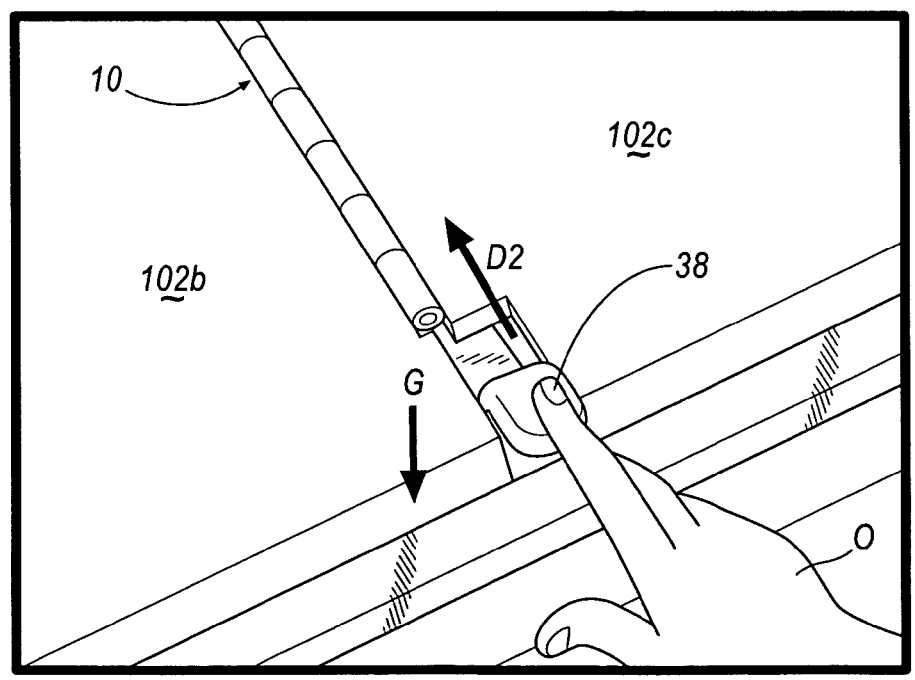
FIG. 6B is an enlarged view of the locking hinge indicated by the circled area in FIG. 5 being moved to a locked position.

As shown in FIG. 6B, the operator, O, may selectively move the finger 38 in a direction according to arrow, D2, that is opposite the arrow, D1, to position the locking hinge 10 in a locked state. With the locking hinge 10 in a locked state, the second and third panels 102b and 102c are not permitted to pivot about the pivoting arc, A2. As a result, the accordion-style slop, which is associated with the conventional door structure 100, is eliminated because the second and third panels 102b, 102c act as a single panel unit. Thus, the door structure 50 no longer operates with three hinges, but with two hinges.

Figure 7A:
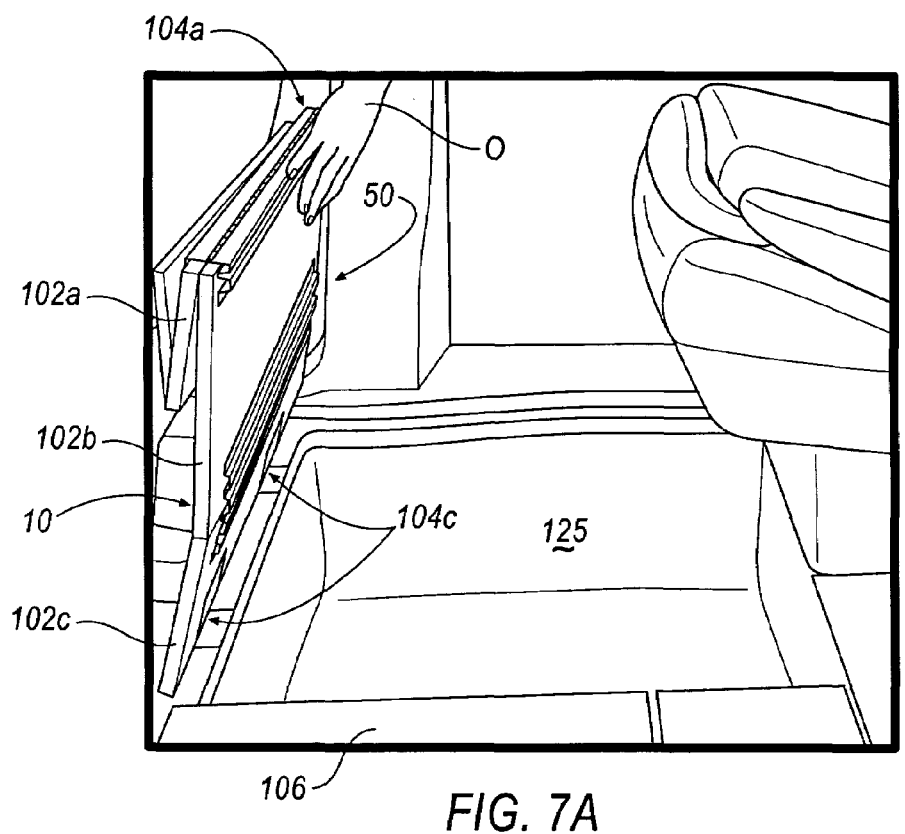
FIG. 7A is an environmental view of the door structure of the vehicle floor when the locking hinge is in a locked position according to FIG. 6B.
Figure 7B:
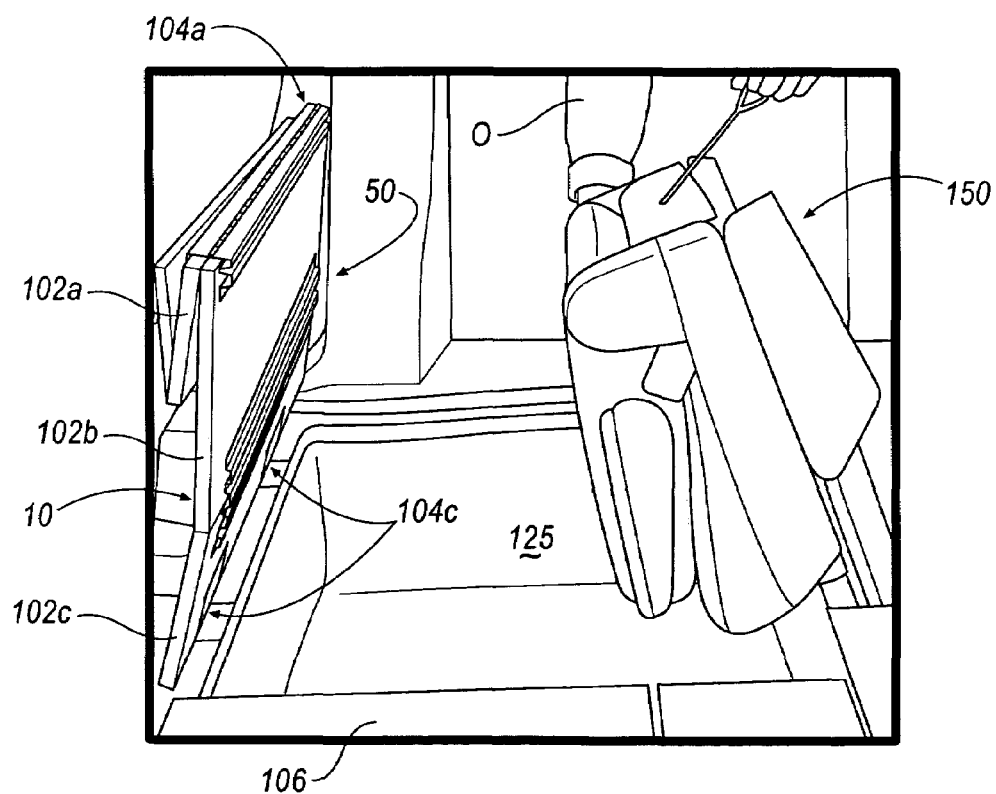
FIG. 7B is another environmental view of the door structure of the vehicle floor according to FIG. 7A.
Figure 7C:
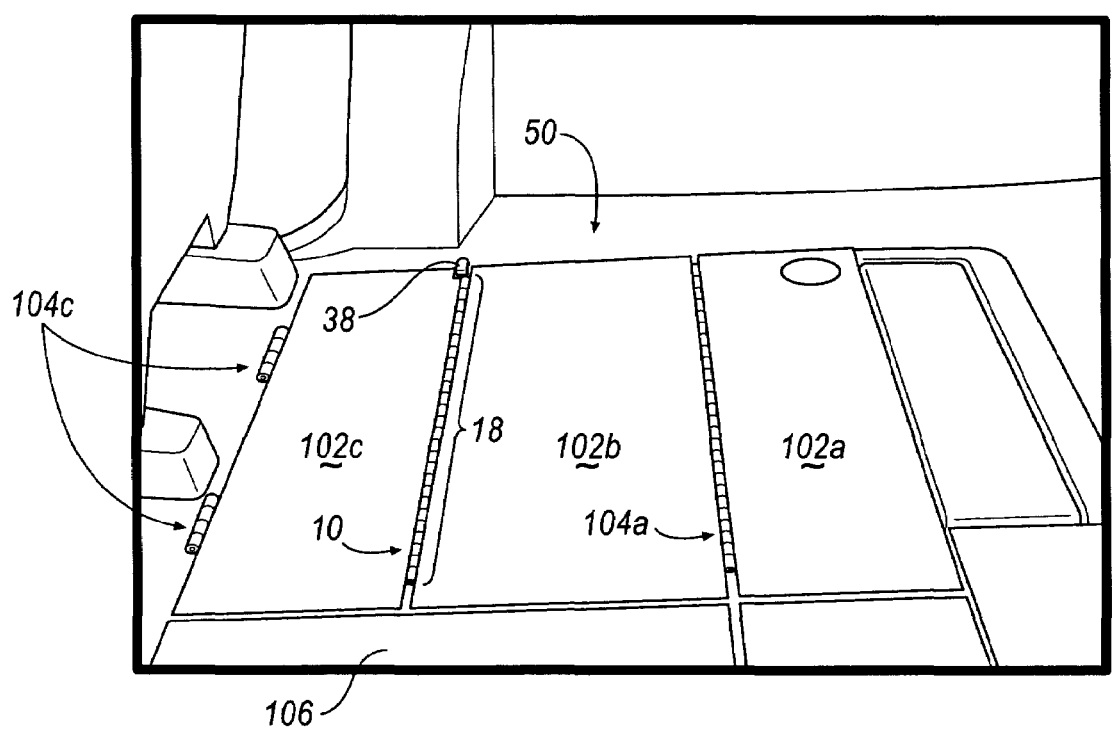
FIG. 7C is another environmental view of the door structure of the vehicle floor according to FIG. 7B.

As seen in FIG. 7A, with the locking hinge 10 in a locked state, the operator, O, may deploy the door structure 50 in a one-handed operation such that the operator, O, does not have to support and stabilize the door structure 50 with a second hand as in conventional multi-panel floor door structures. Accordingly, as shown in FIGS. 7B and 7C, the operator, O, may easily tumble the stow-to-floor seat 150 into the stowage cavity 125 without any interference from the door structure 50 while, if desired, holding the door structure 50 with one hand. However, it will be appreciated that upon deploying the door structure 50 as shown in FIG. 7B, the third hinge 104c may be designed in such a manner that the door structure 50 may be self-standing without the support from the operator, O, such that both hands may be employed to stow the seat 150 into the stowage cavity 125.

Although the locking hinge 10 is shown as part of a door structure 50 for a stow-to-floor seat application, it will be appreciated that the locking hinge 10 may be included as part of a door structure at any desirable location in the vehicle, such as, for example, in the rear area of a vehicle such that groceries, and the like, may be stowed in a stowage cavity 125 under a vehicle floor 106 proximate the hatchback opening of a mini-van, for example. It will also be appreciated that a locking hinge 10 may be included for every hinge location in a door structure; for example, a three panel door structure similar to that shown in FIGS. 9A-9E may include a locking hinge 10 at the location of the first hinge 104a as well as at the second hinge 104b. As such, a three panel door structure may be configured to have a single pivot arc, A3, if both hinge locations 104a, 104b are locked, or, alternatively, any combination of dual pivoting arcs, A1 and A3, or A2 and A3, if one of the hinge locations 104a, 104b is locked, or, alternatively, three pivoting arcs, A1-A3, if both of the hinge locations 104a, 104b are unlocked. Even further, it will be appreciated that the third hinge 104c may also include the locking hinge such that every hinge of the door structure may be locked to prevent any pivotable movement of the door structure.

Figure 8A:
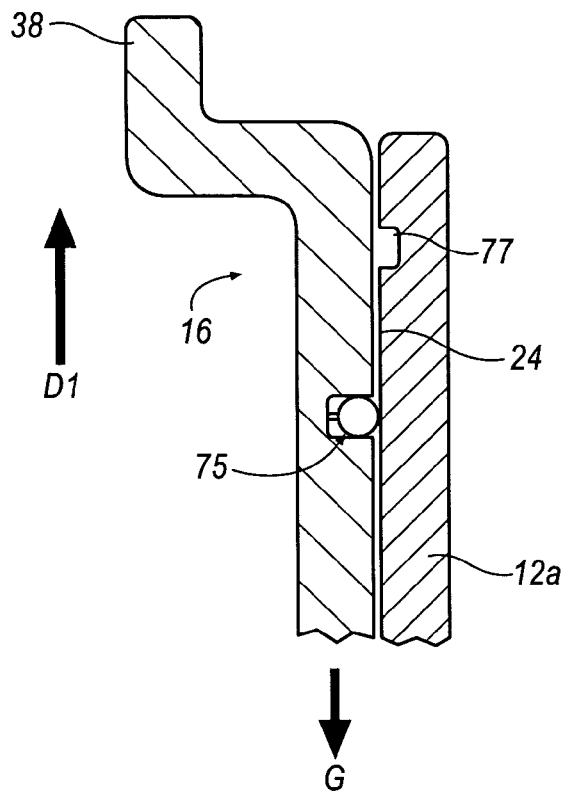
FIG. 8A is a cross-sectional view of the locking hinge according to an embodiment.
Figure 8B:
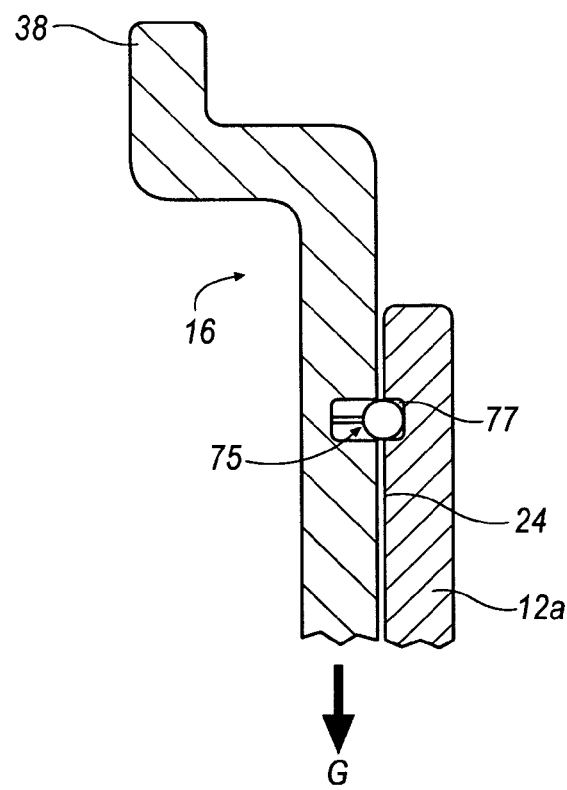
FIG. 8B is another cross-sectional view of the locking hinge according to FIG. 8A.

Even further, it will be appreciated that the locking hinge 10 is not limited to horizontal applications as shown in FIGS. 5-7C. As illustrated in FIGS. 6A and 6B, the locking rod 16 slides horizontally, with respective to gravity, G, about the channel 24 formed in the first hinge panel 12a. Accordingly, gravity, G, causes the locking rod 16 to rest within the channel 24, adjacent the first hinge panel 12a. If desired, the locking hinge 10 may be designed to be part of a vertical hinge application. Accordingly, as seen in FIGS. 8A and 8B, a frictional element, such as a spring-loaded ball 75 and detent 77, may be included with the locking rod 16 and first hinge panel 12a, respectively, to prevent gravity, G, from moving the locking rod 16 in the direction opposite the arrow, D1, when the locking hinge 10 is moved to an unlocked state. As such, when the operator, O, moves the locking rod 16 in the direction of the arrow, D1, to position the locking hinge 10 in an unlocked state (FIG. 3B), the spring-loaded ball 75 may be located into the detent 77 to prevent gravity, G, from moving the locking rod 16 to the locked state position (FIG. 3A). Although a spring-loaded ball 75 and detent 77 is shown in FIGS. 8A and 8B, it will be appreciated that other frictional elements may be substituted to prevent gravity, G, from causing the locking rod 16 to shift its position from an unlocked position to a locked position (i.e., in a direction opposite the arrow, D1).

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A locking hinge, comprising:
   a first hinge panel and a second hinge panel pivotably connected by a pivot pin about a pivoting axis; and
   a locking rod slidably received by one of the first or second hinge panels along a sliding axis, wherein the sliding axis is substantially parallel the pivoting axis, wherein the locking rod and one of the first and second hinge panels include a spring-loaded ball and detent to prevent movement of the locking rod from a first position to a second position.

2. The locking hinge according to claim 1, wherein the locking rod includes at least one locking tab capable of extending through passages formed in the first hinge panel and second hinge panel.

3. The locking hinge according to claim 2, wherein the at least one locking tab includes a radial portion that extends in a radial direction from the locking rod and an axial portion tat extends axially from the radial portion substantially parallel the sliding axis of the locking rod.

4. The locking hinge according to claim 3, wherein the axial portion of the at least one locking tab overlaps a wall portion of one of the first or second hinge panels when the locking hinge is in a locked state.

5. The locking hinge according to claim 3, wherein the axial portion of the at least one locking tab resides within the passage of one of the first and second hinge panels when the locking hinge is in an unlocked state.

6. The locking hinge according to claim 1, wherein the locking rod is slidably received in a recessed channel formed in one of the first or second hinge panels.

7. A vehicle door structure, comprising:
   a first panel pivotably connected relative a second panel by a locking hinge as recited in claim 1.

8. The vehicle door structure according to claim 7, wherein pivotable movement of the second panel relative the first panel is prevented when the locking hinge is in a locked state.

9. The vehicle door structure according to claim 8, wherein the first panel is pivotably connected to a vehicle floor by a hinge, and wherein the vehicle door structure is pivotable about the hinge to permit unobstructed access to a stowage cavity under the vehicle floor.

10. The vehicle door structure according to claim 7, wherein pivotable movement of the second panel relative the first panel is permitted when the locking hinge is in an unlocked state to permit at least partial access to a stowage cavity under the vehicle floor.

11. A stow-to-floor seat assembly door, comprising:
    a first panel pivotably connected relative a second panel by a first binge;
    a third panel pivotably connected relative the second panel by a locking hinge, wherein pivotable movement of the second panel relative the third panel is restricted when the locking hinge is in a locked state, wherein the third panel is pivotably connected to a vehicle floor by a second hinge to permit unobstructed access to a stowage cavity under the vehicle floor for stowing a collapsible stow-to-floor seat, wherein the locking binge includes a locking rod and a pivot pin that connects a first hinge panel and a second hinge panel, wherein the locking rod traverses the first hinge panel and the second hinge panel, and wherein the locking rod includes locking tabs that extend through passages formed in the first hinge panel and second hinge panel.

* * * * *

UNITED STATES PATENT AND TRADEMARK OFFICE
CERTIFICATE OF CORRECTION

PATENT NO. : 7,322,629 B2
APPLICATION NO. : 11/189297
DATED : January 29, 2008
INVENTOR(S) : Steven D. McClintock Page 1 of 1

It is certified that error appears in the above-identified patent and that said Letters Patent is hereby corrected as shown below:

In Claim 3, Col. 6, Line 33 change "tat"to -- that --.

In Claim 11, Col. 6, Line 65, change "binge" to -- hinge --.

In Claim 11, Col. 7, Line 7, change "binge" to -- hinge --.

Signed and Sealed this

Sixth Day of May, 2008

JON W. DUDAS
*Director of the United States Patent and Trademark Office*